: 2,901,516

MANUFACTURE OF 2,2,3,3-TETRACHLORO-1,4-BUTANEDIOL

Robert W. Wynn, Easton, Pa., assignor to General Aniline & Film Corporation, New York, N.Y., a corporation of Delaware No Drawing. Application July 23, 1956
Serial No. 599,359

5 Claims. (Cl. 260—633)

This invention relates to a novel method for producing the compound 2,2,3,3-tetrachloro-1,4-butanediol and to a novel intermediate compound produced in such method.

In my copending application, Serial No. 548,769, filed November 23, 1955, there is disclosed and claimed the compound 2,2,3,3-tetrachloro-1,4-butanediol and a novel method for its production by subjecting 2-butyne-1,4-diol to the action of an amount of gaseous chlorine, at least about 25% in excess of that theoretically required to saturate said 2-butyne-1,4-diol, in an inert aromatic hydrocarbon liquid medium and in the presence of a weak acid acceptor. Said compound is useful as a nematocide, mothproofing agent and as the active ingredient in dusting powder (insecticidal) formulations. It is also a valuable intermediate which may be employed for the production of polyesters by reaction with polybasic acids such as adipic, phthalic, maleic, fumaric, chlorendic, or the like, or their halides, esters, nitriles or anhydrides, followed by polymerization of the resulting esters. Such polyesters contain a relatively high proportion of chlorine to which is attributable such properties as flame resistance, biocidal activity, and the like. Such polyesters which are liquid are of interest as cutting oils, in addition to the diesters of the instant product with monobasic acids.

While the process disclosed in said application is satisfactory and relatively simple to operate, the yields obtained therein have not been as high as could be desired, being usually of the order of about 35% of theoretical. It is an object of this invention to provide a new process for the production of 2,2,3,3-tetrachloro-1,4-butanediol in improved yields. Another object of this invention is the provision of a novel intermediate compound for use in such a process. Other objects and advantages will appear as the description proceeds.

The attainment of the above objects is made possible by the instant invention, which comprises as novel intermediate compounds 1,4-diacyloxy-2,2,3,3-tetrachlorobutanes and a process comprising reacting a 1,4-diacyloxy-2-butyne with sufficient chlorine to produce the corresponding 1,4 - diacyloxy - 2,2,3,3-tetrachlorobutane and then subjecting the latter to hydrolysis conditions to produce the desired 2,2,3,3-tetrachloro-1,4-butanediol. The invention also includes, in combination with the aforementioned process, the reaction of 2-butyne-1,4-diol under esterifying conditions with an amount of an acylating agent sufficient to produce the corresponding 1,4-diacyloxy-2-butyne. The process of this invention has been found to enable the attainment of yields of more than 70% of theoretical.

The series of reactions involved in the production of 2,2,3,3-tetrachloro-1,4-butanediol from 2-butyne-1,4-diol in accordance with the instant invention may be schematically portrayed as follows:

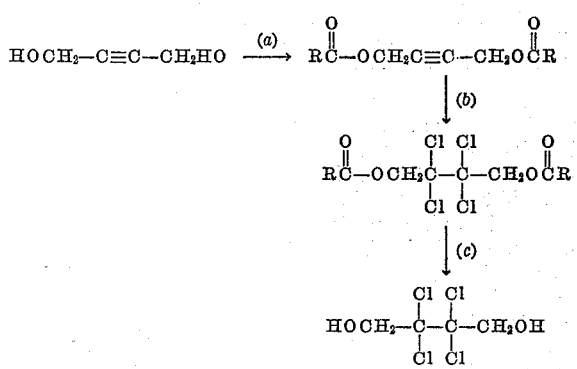

In the above formulae, R represents the residue of an organic carboxylic acid of the formula RCOOH relatively inert to chlorination and may be hydrogen, alkyl, such as methyl, ethyl, lauryl, and the like, aryl, such as phenyl, naphthyl, tolyl, and the like, aralkyl, such as benzyl and the like, or hetero, such as furyl, 3-pyridinyl and the like.

As representative of suitable acylating agents of the effective formula RCOOH which may be reacted under esterifying conditions with 2-butyne-1,4-diol in step (a) above to produce the corresponding 1,4-diacyloxy-2-butyne, there may be mentioned such acids as formic, acetic, propionic, capric, lauric, stearic, palmitic, benzoic, naphthoic, o-, m-, and p-methylbenzoic, phenylacetic, phenylpropionic, furoic, and nicotinic acids, and their chlorides. Usual esterifying conditions known in the art are maintained, the acylating reaction being carried out preferably in the presence of an inert diluent such as benzene, toluene, xylene, chlorobenzene, dichlorobenzene and similar inert aromatic hydrocarbons and chlorinated derivatives thereof, and in the presence of a catalyst such as p-toluenesulfonic, benzenesulfonic, sulfuric and hydrochloric acids, and the like. The reaction is carried out at elevated temperatures, preferably at reflux, with simultaneous removal of the water formed during the reaction. The acylation to produce the 1,4-diacyloxy-2-butyne requires reaction of one mole of 2-butyne-1,4-diol with two molecular equivalents of the acylating agent, an excess of the acylating agent being sometimes desirable to accelerate the reaction to completion. It will be understood that in such esterifying reactions, one mole of an anhydride is equivalent to two moles of the corresponding organic carboxylic acid. The 1,4-diacyloxy-2-butyne thus produced may then be separated from the reaction mixture in known manner, for example, by distilling off the diluent and, if desired, further purifying the product by distillation, recrystallization, and/or the like.

In step (b) above, the 1,4-diacyloxy-2-butyne is then reacted in accordance with the instant invention with sufficient chlorine to produce the corresponding 1,4-diacyloxy-2,2,3,3-tetrachlorobutane. The chlorination is carried out in known manner, preferably by reaction with molecular chlorine in the presence of an inert organic diluent similar to that employed in the above-described acylating reaction. It will be obvious that the chlorination requires addition of four atoms of chlorine to the unsaturated bond in the 1,4-diacyloxy-2-butyne. The resulting 1,4-diacyloxy-2,2,3,3-tetrachlorobutane may then be readily separated in known manner by distilling off the organic diluent and, if desired, further purifying by distillation and/or recrystallization from a solvent therefor, such as ethanol, methanol, and the like.

In accordance with the instant invention, the 1,4-diacyloxy-2,2,3,3-tetrachlorobutane is subjected in step (c) above to hydrolysis conditions to produce the desired 2,2,3,3 - tetrachloro - 1,4 - butanediol. Known hydrolysis conditions may be employed, the preferred method including treatment of the 1,4-diacyloxy-2,2,3,3-tetrachlorobutane at elevated temperatures, preferably at reflux (about 100° C.), in an acidified aqueous medium such as dilute sulfuric acid, hydrochloric acid or the like. The resulting 2,2,3,3-tetrachloro-1,4-butanediol may then be readily separated and/or purified in known manner by filtration, washing, recrystallization from a solvent therefor, and/or treatment with activated carbon and the like.

It will be understood that the reactions described above may, if desired, be carried out in a single reaction vessel by directly chlorinating the 1,4-diacyloxy-2-butyne without isolation from the esterifying medium in which it is produced, stripping off the solvent and then adding dilute sulfuric acid or other acidic hydrolyzing agent to the reaction vessel to produce the desired product. It will also be understood that other methods may be employed for the production of the 1,4-diacyloxy-2-butyne intermediate which is subjected to chlorination to produce the corresponding 1,4-diacyloxy-2,2,3,3-tetrachlorobutane.

The following examples, in which parts are by weight unless otherwise indicated, are illustrative of the instant invention and are not to be regarded as limitative:

EXAMPLE 1

*Preparation of 1,4-diacetoxy-2-butyne*

Into a 5-liter flask equipped with dropping funnel, Vigreaux column to azeotropic adapter and reflux condenser and stirrer are charged 860 g. (10 moles) of 2-butyne-1,4-diol, 2000 cc. benzene and 10 g. p-toluenesulfonic acid monohydrate. 1531.5 g. (15 moles) of acetic anhydride is added from the dropping funnel at such a rate that with very little external heating the solution continuously refluxes. After the addition is completed, the solution is refluxed 28 hours longer during which time 105 cc. of water collects in the azeotropic adapter. The solution is then cooled to room temperature and washed successively with two 500 cc. portions of aqueous 20% sodium carbonate, two 500 cc. portions of sold water and one 500 cc. portion of saturated sodium chloride solution. The benzene is then removed under aspirator vacuum and the residue distilled through an 8″ x 1″ Vigreaux column. Yield: 1544 g. (90.8% theory), boiling point 146–150° C./28–34 mm., $N_D^{25}=1.4510$.

EXAMPLE 2

*Chlorination of 1,4-diacetoxy-2-butyne; 1,4-diacetoxy-2,2,3,3-tetrachlorobutane*

Into a 1-liter flask fitted with stirrer, thermometer, gas inlet tube and vent to the hood is charged 85 g. (0.5 M) 1,4-diacetoxy-2-butyne and 500 cc. benzene. The solution is cooled to 10° C. and at 10 to 15° C. 90 g. (1.28 M) of chlorine gas are added over a 3-hour period. The benzene is immediately removed by distillation under aspirator vacuum. After removal of the benzene the flask is finally heated on the steam bath while under vacuum to 65° C. The residue is then cooled in an ice-water bath to 5° C. during which it completely solidifies. As much of the solid as possible is worked out of the flask onto a Büchner funnel. The residual material in the flask is dissolved out with 25 cc. of hot methanol. The hot methanol solution is cooled to 5° C. The precipitate which forms and the methanol are added to the solid on the Büchner funnel. This is sucked as dry as possible and finally dried under aspirator vacuum at room temperature. Yield: 156 g. (quantitative). This material is then recrystallized from 90 cc. of methanol to yield 141 g. (90%) of a white crystalline product melting at 78–81° C.

EXAMPLE 3

*Hydrolysis of 1,4-diacetoxy-2,2,3,3-tetrachlorobutane; 2,2,3,3-tetrachloro-1,4-butanediol*

A 1-liter flask equipped with stirrer and reflux condenser is charged with 156.5 g. of 1,4-diacetoxy-2,2,3,3-tetrachlorobutane (crude—as obtained from Example 2 before recrystallization from methanol); 375 cc. water and 20 cc. concentrated sulfuric acid. The mixture is refluxed 3 hours during which time complete dissolution occurs. The flask and its contents are then cooled to 5° C. and held at 3–5° C. for ½ hour. The precipitate which forms is filtered off and washed with a little cold water. It is then sucked as dry as possible and finally dried in a vacuum desiccator at room temperature. Yield: 100 g. (85%) of a light tan colored product. This material is dissolved in 1000 cc. of hot benzene and treated with 0.5 g. of Norit (activated carbon). The hot solution is gravity filtered through a steam jacketed funnel and the filtrate cooled to 5° C. The precipitate is collected and vacuum dried at room temperature. Yield: 94.5 g. (80%) of a beautiful white crystalline product which melts with decomposition over the range 252–255° C.

EXAMPLE 4

*Hydrolysis of 1,4-diacetoxy-2,2,3,3-tetrachlorobutane; 2,2,3,3-tetrachloro-1,4-butanediol*

A 1-liter flask equipped with stirrer and reflux condenser is charged with 141 g. of 1,4-diacetoxy-2,2,3,3-tetrachlorobutane (purified—as obtained from Example 2 after recrystallization from methanol), 325 cc. $H_2O$ and 20 cc. concentrated sulfuric acid. The mixture is stirred and heated to reflux for 5 hours. It is then cooled to 3–5° C. for ½ hour, filtered, washed with a little cold water and vacuum dried at room temperature. Yield: 98.5 g. (95%) of a crystalline material just off white in color, which melts with decomposition over the range 220–230° C.

EXAMPLE 5

*Preparation of 1,4-dilauroyloxy-2-butyne*

Into a 1-liter flask equipped with stirrer, thermometer and reflux condenser with azeotropic adapter are charged 43.0 g. (0.5 M) 2-butyne-1,4-diol, 350 cc. toluene, 201.0 g. (1.0 M) lauric acid and 5.0 g. p-toluenesulfonic acid monohydrate. The mixture is refluxed for 16 hours and 18 cc. (1.0 M) of water removed. The solvent is removed under aspirator vacuum and the residue dried to constant weight. Crude yield=230.8 gms. This crude material is recrystallized several times from methanol to yield 122 gms. of white crystalline material melting at 48–49° C.

EXAMPLE 6

*Chlorination of 1,4-dilauroyloxy-2-butyne; 2,2,3,3-tetrachloro-1,4-dilauroyloxybutane*

31.0 g. (0.07 M) 1,4-dilauroyloxy-2-butyne is dissolved in 250 cc. benzene and at 35–40° C. 14.0 g. chlorine gas is added over a two-hour period. The mixture is stirred at 30° C. two hours longer. The benzene is removed under aspirator vacuum. The 40.2 gms. of residue are recrystallized twice from methanol to yield 11.0 gms. of waxy crystals melting at 30–35° C. The product may be hydrolyzed by the procedure of Examples 3 or 4 above to produce 2,2,3,3-tetrachloro-1,4-butanediol.

EXAMPLE 7

*Preparation of 1,4-dibenzoyloxy-2-butyne*

Into a 1-liter flask equipped with stirrer, thermometer and reflux condenser with azeotropic adapter are charged 43.0 g. (0.5 M) 2-butyne-1,4-diol, 350.0 cc. toluene, 122.0 g. (1.0 M) benzoic acid and 5.0 g. p-toluenesulfonic acid monohydrate. The mixture is refluxed 20 hours and 18 cc. of water azeotropically removed. The solvent is removed under aspirator vacuum to yield 153 gms. of crude product. Recrystallization from an ethanol-water mixture yields 87 gms. Further recrystallization from ethanol and methanol yields an off-white crystalline product melting at 74–79° C.

EXAMPLE 8

*Chlorination of 1,4-dibenzoyloxy-2-butyne; 2,2,3,3-tetrachloro-1,4-dibenzoyloxybutane*

14.7 g. (0.05 M) 1,4-dibenzoyloxy-2-butyne is dissolved in 200.0 cc. benzene and at 10–15° C. 10.0 gms. of chlorine gas added in ½ hour. 90% of the benzene is immediately removed under aspirator vacuum and the solid material (14.0 gms.) collected from the residue. Two recrystallizations from ethanol yield 6.7 gms. of product with a melting point of 130–135° C. The product may be hydrolyzed by the procedure of Examples 3 or 4 above to produce 2,2,3,3-tetrachloro-1,4-butanediol.

EXAMPLE 9

*Preparation of 1,4-difuroyloxy-2-butyne*

Into a 1-liter flask equipped with stirrer, thermometer and reflux condenser with azeotropic adapter are charged 43.0 g. (0.5 M) 2-butyne-1,4-diol, 300.0 cc. toluene, 112.0 g. (1.0 M) furoic acid and 5.0 g. p-toluenesulfonic acid monohydrate. The mixture is refluxed 20 hours and 16 cc. of water removed. The mixture is cooled and filtered and the product dried. The yield of crude material is 117 gms. This material is extracted with an excess of warm sodium bicarbonate solution and then washed with water and dried to yield 94.5 gms. of product. Reprecipitation from a mixture of benzene and high boiling petroleum ether yields 50 gms. of yellow product. M.P. 165–168° C.

EXAMPLE 10

*Chlorination of 1,4-difuroyloxy-2-butyne; 2,2,3,3-tetrachloro-1,4-difuroyloxybutane*

13.7 g. (0.05 M) 1,4-difuroyloxy-2-butyne is dissolved in 200.0 cc. benzene and at 30–35° C. 10.0 g. of chlorine gas added over a two-hour period. The mixture is stirred two hours longer at 30° C. The solvent is removed under aspirator vacuum and the residue recrystallized from methanol to yield 8.0 gms. of product which may be hydrolyzed by the procedure of Examples 3 or 4 to produce 2,2,3,3-tetrachloro-1,4-butanediol.

This invention has been disclosed with respect to certain preferred embodiments and various modifications and variations thereof will become obvious to the person skilled in the art. It is to be understood that such modifications and variations are to be included within the spirit and purview of this application and the scope of the appended claims.

I claim:

1. A process comprising reacting a 1,4-diacyloxy-2-butyne, wherein said acyl group is that of a monocarboxylic acid of the formula RCOOH wherein R is selected from the group consisting of hydrogen, alkyl, phenyl, naphthyl, tolyl, benzyl, furyl and 3-pyridinyl, with sufficient chlorine to produce the corresponding 1,4-diacyloxy-2,2,3,3-tetrachlorobutane, and then subjecting the latter to hydrolysis conditions to produce the desired 2,2,3,3-tetrachloro-1,4-butanediol.

2. A process as defined in claim 1 wherein said acyloxy groups are acetoxy groups.

3. A process as defined in claim 1 wherein said acyloxy groups are lauroyloxy groups.

4. A process as defined in claim 1 wherein said acyloxy groups are benzoyloxy groups.

5. A process as defined in claim 1 wherein said acyloxy groups are furoyloxy groups.

References Cited in the file of this patent

UNITED STATES PATENTS 2,648,702  De Garmo _____ Aug. 11, 1953

UNITED STATES PATENT OFFICE
CERTIFICATION OF CORRECTION

August 25, 1959

Patent No. 2,901,516

Robert W. Wynn

It is hereby certified that error appears in the above numbered patent requiring correction and that the said Letters Patent should read as corrected below.

Column 3, line 53, for "sold water" read -- cold water --.

Signed and sealed this 30th day of May 1961.

(SEAL)
Attest:

ERNEST W. SWIDER
Attesting Officer

DAVID L. LADD
Commissioner of Patents